Nov. 1, 1960 G. K. NEWELL 2,958,397
BRAKE RIGGING
Filed Feb. 25, 1957 2 Sheets-Sheet 1
Fig-1
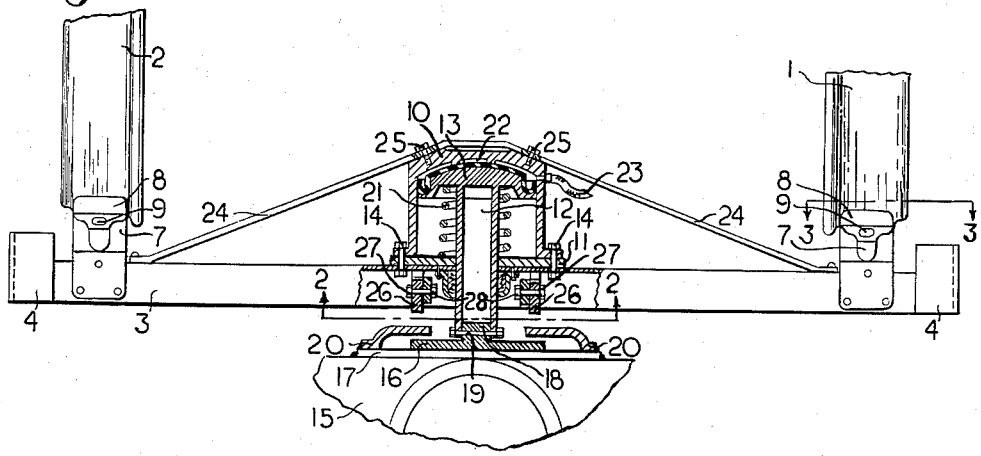
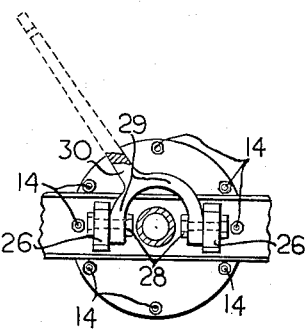
Fig-2
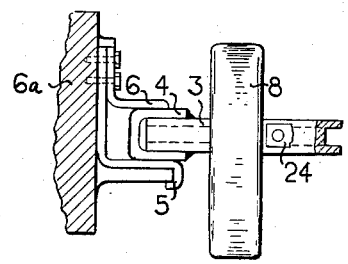
Fig-3
INVENTOR.
George K. Newell
BY
Adelbert A. Steinmiller
Attorney Nov. 1, 1960  G. K. NEWELL  2,958,397
BRAKE RIGGING
Filed Feb. 25, 1957  2 Sheets-Sheet 2
Fig-4
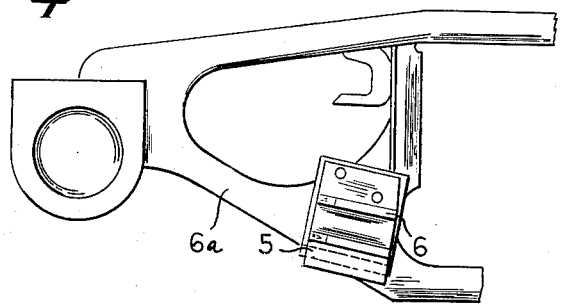
Fig-5
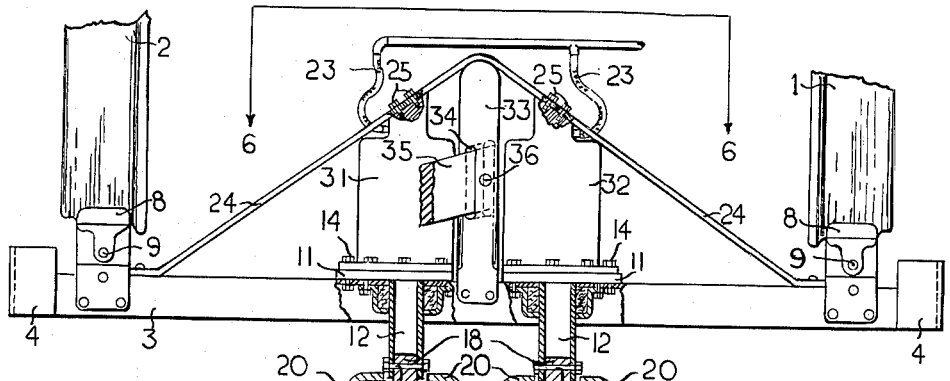
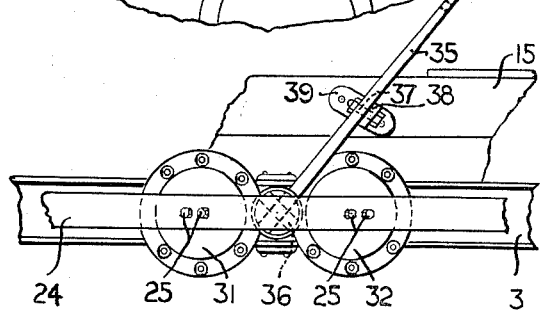
Fig-6
INVENTOR.
George K. Newell
BY
Adelbert A. Steinmiller
Attorney ര
United States Patent Office 2,958,397
Patented Nov. 1, 1960

2,958,397

BRAKE RIGGING

George K. Newell, Pitcairn, Pa., assignor to Westinghouse Air Brake Company, Wilmerding, Pa., a corporation of Pennsylvania Filed Feb. 25, 1957, Ser. No. 642,167

7 Claims. (Cl. 188—33)

This invention relates to brake rigging for railway rolling stock and more particularly to brake rigging for freight cars.

One of the present day conventional brake riggings for freight cars consists of one or more brake cylinders carried on the underside of the car body and having the piston rods thereof connected through rods and levers to the brake shoes, independently hung on brake shoe hangers from the truck frame, to effect movement of brake shoes into and out of engagement with the tread of the car truck wheels.

Due to wear at the number of pivotal connections between the rods and levers of the conventional brake rigging, and due to wear of the conventional cast iron brake shoes, automatic slack adjusters are desirable to take up slack in the rigging as it occurs.

The comparatively recent commercial adoption and increasing use by the railroads of composition brake shoes for railway rolling stock has made it desirable to devise new and different types of brake rigging to utilize the benefits to be gained from the desirable characteristics of the composition brake shoe compared to the old conventional cast iron type of brake shoe.

Composition brake shoes have a considerably higher friction coefficient as compared to cast iron shoes. Therefore, the composition brake shoes require a lesser braking force than conventional cast iron shoes for an equivalent braking effect.

In order to utilize the characteristics of the composition brake shoe to attain a simple and lightweight brake rigging, especially for freight cars, the present invention comprises a brake beam, similar in construction to a present-day standard brake beam, modified in a novel manner however, by the inclusion of one or more brake cylinders directly in the structural framework thereof and reacting with the truck transom or bolster to cause application of braking force to the brake beam and consequently to the brake shoes carried by the brake beam.

It is accordingly the principal object of the present invention to provide a novel brake rigging, for freight cars equipped with composition type brake shoes, in which small size brake cylinders, made possible of use due to low braking forces required, are secured to or formed integral with a brake beam, and are effective to exert braking forces by reaction with a part of a railway car truck frame, such as the truck bolster, upon the supply of fluid under pressure to the pressure chamber of each brake cylinder.

Another object is to provide a novel lightweight brake rigging by modification of existing brake beams through welding or otherwise securing thereto one or more small brake cylinders of sufficient capacity to provide the required reduced braking forces necessary to brake a freight car using composition brake shoes.

Other objects and advantages will be apparent from the following detailed description of the invention.

In the accompanying drawings:

Fig. 1 is a plan view, partially in section, of a brake rigging embodying one form of the invention as applied to one wheel and axle unit of a four-wheel type railway car truck, a similar brake rigging being applied to the other wheel and axle unit of the truck.

Fig. 2 is a cross-sectional view, taken on the line 2—2 of Fig. 1, looking in the direction of the arrows and showing a hand-operated brake lever secured to the brake rigging.

Fig. 3 is a view taken on the line 3—3 of Fig. 1 looking in the direction of the arrows, with certain parts omitted for the sake of clarity, and illustrating how the brake rigging may be supported from the side frame of the truck.

Fig. 4 is a partial elevational view of a railway truck side frame having an upper guide and a lower wear plate secured to the inner side of said frame for receiving and supporting the ends of a brake beam of the brake rigging shown in Fig. 1.

Fig. 5 is a plan view, partially in section, of a brake rigging embodying another form of the invention as applied to one wheel and axle unit of a four-wheel type railway car truck, a similar brake rigging being applied to the other wheel and axle unit of the truck.

Fig. 6 is a partial elevational view, taken on the line 6—6 of Fig. 5 and looking in the direction of the arrows, showing the arrangement of a hand brake lever in the brake rigging.

Figs. 1 to 4

As shown in Fig. 1 of the drawings, the reference characters 1 and 2 designate respectively the wheels secured at opposite ends of one axle of a two-axle railway vehicle truck. The wheel and axle unit at the opposite end of the truck is not shown, and since it is provided with brake rigging which is a counterpart of that described, a description of only the brake rigging associated with wheels 1 and 2 will be given herein.

The brake rigging shown comprises a brake beam 3 having the shape of a standard structural channel, illustrated as a U-channel, and extending in a direction at right angles to the rails upon which the wheels 1 and 2 roll. Secured to each end of the brake beam 3 is a guide foot 4 which also may have the shape of a standard structural channel but slightly larger in size than the channel used for brake beam 3 so that it may be fitted over the end of said brake beam and welded or riveted thereto. Each guide foot 4 is slidably supported between a wear plate 5 and an upper guide 6, said wear plates and upper guides being riveted or otherwise secured to a truck side frame 6a, as shown in Figs. 3 and 4. The wear plates and guide feet serve to support the brake beam at the proper height above the rails and at a slight angle to the horizontal to permit movement of said brake beams in a direction radially of the associated wheels when a brake application is made. For simplicity the slight angularity of beam 3 to the horizontal is not shown in the drawings, the beams being shown as if in a horizontal position.

A brakehead 7 is riveted or otherwise attached to each end of the brake beam 3 adjacent to and on the inboard side of the guide feet 4. Each brakehead 7 carries a composition brake shoe 8 for engagement with the tread of an associated wheel 1, 2, said shoe having a backing plate provided with a key bridge to permit the shoe to be removably secured to the brakehead 7 by means of a key 9.

The brake shoes 8 are operated into and out of engagement with their associated wheels 1, 2 by means of a fluid pressure motor or brake cylinder 10 secured to the brake beam 3 in a manner presently to be more fully described. The cylinder 10 has a non-pressure head 11 through which extends a hollow piston rod 12 of a piston 13 slidably operable in the cylinder 10; and the cylinder is attached to the web of the channel comprising the brake beam 3 as by several of a plurality of bolts 14 by which the non-pressure head 11 is secured to the cylinder. The free end of the piston rod 12 is anchored to a member of the car truck frame, such as a truck bolster 15, as by a disc-shaped foot or anchor member 16 which engages in abutting contact a reaction plate 17 secured, as by welding, to the side of the truck bolster 15. The foot member 16 has a circular boss 18 at the center which extends into the open end of the hollow piston rod 12 and is secured to the rod 12 as by a bolt 19 which extends through the rod and boss and has a cooperating nut. The foot member 16 is disposed between the reaction plate 17 and a plurality of radially disposed anchoring brackets 20 welded adjacent one end to the reaction plate. The free end of each bracket 20 is offset sufficiently to provide a space between the free end and the reaction plate 17 slightly greater than the thickness of the foot member 16. This arrangement provides some freedom of motion for the brake beam 3, brake cylinder and push rod 12 to move upward as the guide feet 4 move along the inclined wear plates 5 when a brake application is made, to insure proper contact between the brake shoes and the tread of the wheels. Furthermore, the brackets 20 are so arranged with respect to the foot member 16 that sufficient clearance is provided whereby the relative movement of the bolster 15 with respect to the foot member 16, due to changes in the load on the car, will not cause the brackets to bind against the foot member 16.

A spring 21 interposed between the piston 13 and the non-pressure head 11 serves to yieldingly bias the cylinder 10 and the connected brake beam 3 and brake shoes 8 in a brake releasing direction to the position in which the cylinder 10 is shown in Fig. 1 of the drawings.

Formed on a packing cup secured to the piston 13 are a plurality of lugs which, when the piston 13 occupies the position in which it is shown in Fig. 1, contact the end wall or pressure head of the cylinder 10 to form between the piston and the cylinder a pressure chamber 22 to which fluid under pressure may be supplied through a flexible hose 23 which is connected to the usual air brake system on railway freight cars. Fluid under pressure supplied to pressure chamber 22 causes movement of the cylinder 10, brake beam 3 and brake shoes 8, against the resistance of spring 21, in a direction to effect braking engagement of the brake shoes with the tread of the wheels.

Additional support for imparting greater rigidity of the cylinder and brake beam structure may be provided, as shown, by a strap 24, commonly referred to in truss-type brake beams as the tension member, suitably secured at opposite ends to respective opposite ends of the brake beam 3, commonly referred to in truss-type brake beams as the compression member. The cylinder 10, in such case, serves as the usual strut member of the truss-type brake beam, and has its pressure head secured as by screws 25 to the strap 24.

In order to provide in customary fashion for operation of the brake beam by hand brake means, a pair of lugs 26, each equally spaced from the center of brake beam 3 and disposed one on each side of piston rod 12, are secured, as by welding, to the web of the channel constituting said beam, and pivotally connected to the lugs 26, as by bolts 27 and nuts 28, are the opposite fingers of a clevis 29 formed at one end of a hand brake lever 30. The lever 30 is slanted laterally of the car truck and suitably fulcrumed on the truck bolster 15. The free end of hand brake lever 30 is connected through a system of levers, links and chains (not shown) to the hand brake wheel which is located at one end of the freight car.

When it is desired to effect a brake application, fluid under pressure is admitted to the pressure chamber 22 in cylinder 10 through the flexible hose 23 which is connected to the usual air brake system on railway freight cars. Fluid under pressure thus applied to the chamber 22 formed between the piston 13 and the pressure head of the brake cylinder 10 is effective to move said cylinder with respect to said piston which is anchored against movement as previously described. It will be understood that the second brake beam (not shown) located on the other side of truck bolster 15 is operated similarly to effect braking of the other pair of wheels of the same freight car truck.

As the brake beam 3 is moved as described above, said beam is supported and guided by the guide feet 4 as said feet have sliding engagement along the upper surface of the wear plates 5. The guide feet 4 are disposed between the upper surface of wear plates 5 and the lower surface of upper guides 6 so that the brake beam 3 and brake shoes 8 carried thereby are movable radially toward or away from the wheels.

When it is desired to release the brake application, the fluid under pressure supplied to chamber 22 is vented in the usual manner to atmosphere through the flexible hose 23 and the car brake system (not shown), whereupon the force of spring 21 acting on the non-pressure head 11 moves the brake cylinder 10, brake beam 3 and shoes 8 in a direction away from the wheels 1 and 2 to effect a brake release.

It will be noted that it is not necessary to use a slack adjuster with this type of brake rigging. Since there are no links and levers between the brake cylinder and the brake beam of the present invention there can be no wear therein which must be compensated for by a slack adjuster as in conventional brake rigging. It should be understood that the length of the bore in the cylinder 10 is made sufficient to provide for the relative movement between the cylinder 10 and the piston 13, in addition to the normal relative movement required to effect engagement of the brake shoe with the wheel treads, by an amount approximately two-thirds the thickness of the friction block of the brake shoe, without compressing release spring 21 to its solid height. Thus, as the material of the brake shoes 8 wears away, the shoes are always properly maintained in braking engagement with the wheels 1 and 2 during each brake application throughout their useful life without the necessity of a slack adjuster to compensate for wear of the shoes.

*Figs. 5 and 6*

The brake rigging shown in Figs. 5 and 6 is generally similar to that shown in Figs. 1 to 4 inclusive, except that two brake cylinders 31 and 32, each smaller in diameter than brake cylinder 10, are used in place of the single brake cylinder 10 shown in Fig. 1. Other elements in these figures which are the counterparts of elements in Figs. 1 to 4 are identified by the same reference characters as in Figs. 1 to 4 without further description. The mounting arrangement for the hand brake lever shown in Figs. 5 and 6, differs somewhat from that shown in Figs. 1 to 4 chiefly in the details of the structure whereby the hand brake lever is operatively connected to the brake beam 3.

The arrangement shown in Figs. 5 and 6 comprises a central strut 33 riveted at one end to the brake beam 3 and welded or otherwise secured at its opposite end to the strap 24. Disposed on opposite sides of the strut 33 are the cylinders 31 and 32, each of which is secured to the web of the channel comprising the brake beam 3 by bolts 14 as is the cylinder 10 shown in Fig. 1. The brake cylinders 31 and 32 are also secured to the strap 24, as by screws 25. Each of the brake cylinders has a piston slidably mounted therein, each piston being provided with a hollow piston rod 12 which extends through a bore in a non-pressure head 11 and a coaxial bore in the web of beam 3. Also contained in each cylinder between the piston and non-pressure head of the cylinder is a release spring (not shown) similar to the release spring 21 of the previous embodiment.

A foot 16 having a boss 18 extending into the open end of each hollow piston rod 12 is secured to said rod, as by a bolt 19 extending through said rod and said boss and a nut therefor. Each foot 16 is disposed between a reaction plate 17 secured to the side of the truck bolster 15 and a plurality of radially disposed foot-restraining brackets 20 welded adjacent one end to said reaction plate, as in Fig. 1. The opposite ends of each pair of restraining brackets are offset sufficient to provide a space between said opposite end and the reaction plate 17 greater in width than the thickness of the feet 16. This space permits the brake beam 3 some freedom of motion for the reason previously explained in connection with the previous embodiment.

In the structure shown in Figs. 5 and 6 the strut 33 is provided with a slot 34, disposed at an angle to vertical, for receiving one end of a hand brake lever 35 which is pivotally connected to the strut 33 as by a pin 36. The lever 35 is fulcrumed on a pin 37 which extends through a bore in said lever and a coaxial bore in a lug 38 of a bracket 39 secured to the truck bolster 15. The opposite end of hand brake lever 35 is connected through the usual hand brake lever mechanism (not shown) to the hand brake wheel.

The operation of the brake mechanism shown in Figs. 5 and 6 is identical with the operation of the mechanism shown in Figs. 1 to 4 inclusive except fluid under pressure is admitted simultaneously to both of the brake cylinders 31 and 32 instead of to but a single cylinder.

A slack adjuster is not necessary for use with the brake beam shown in Figs. 5 and 6 for the same reasons as explained previously in connection with the embodiment shown in Figs. 1 to 4 inclusive.

Although only two forms of the brake beam embodying the invention are shown and described herein, it is to be understood that various changes and modifications may be made therein within the scope of the appended claims without departing from the spirit and scope of my invention.

Having now described the invention, what I claim as new and desire to secure by Letters Patent, is:

1. In a brake rigging for a railway vehicle truck, the combination of a transversely extending brake shoe carrying brake beam supported at each end by the truck frame, a brake cylinder rigidly secured to said brake beam and having a piston slidably operable therein, a piston rod connected to said piston, a truck bolster, a disc-like anchor member connected to the free end of said piston rod for abutting engagement with the side of said truck bolster, and means for loosely securing said anchor member to said truck bolster in such manner that said anchor member may move parallel to said truck bolster or angularly with respect thereto, thereby enabling limited freedom of movement of the brake beam.

2. In a brake rigging for a railway vehicle truck, the combination of a truck frame, a truck bolster carried by said truck frame, a brake beam extending transversely of the truck and carrying brake shoes for engagement with an element to be braked, said brake beam being slidably supported at each end by the frame of the truck, brake cylinder means rigidly secured to said brake beam, piston means slidably operable in said cylinder means and having piston rod means operatively connected at one end to said piston means and anchored at the opposite end to said truck bolster, said brake cylinder means having pressure chamber means to which fluid under pressure may be supplied to move said brake cylinder means and brake beam relative to said truck bolster.

3. A brake rigging as claimed in claim 2, further characterized in that said brake cylinder means comprises a pair of brake cylinders located symmetrically on opposite sides of a point midway between the ends of said beam, one end of each of said brake cylinders being attached to said beam, and in having a strut disposed at right angles to and secured to said beam at said midway point, and means rigidly connecting opposite ends of said beam to said strut and to the end of each of said brake cylinders opposite said one end to provide rigidity of said brake cylinders with respect to said brake beam.

4. A brake rigging as claimed in claim 2, further characterized in that said brake cylinder means comprises a pair of brake cylinders located symmetrically on opposite sides of a point midway between the ends of said beam, one end of each of said brake cylinders being attached to said beam, and in having a strut disposed at right angles to and secured to said beam at said midway point, means rigidly connecting opposite ends of said beam to said strut and to the end of each of said brake cylinders opposite said one end to provide rigidity of said brake cylinders with respect to said brake beam, and a hand brake lever fulcrumed on said truck bolster and connected to said strut in a manner to effect movement of said brake beam by manual operation of said hand brake lever independently of power operation of said beam by said brake cylinder.

5. In a brake rigging for a railway vehicle truck having a pair of side frames and a bolster supported thereon, the combination of a brake beam extending transversely of the truck and carrying brake shoes for engagement with an element to be braked, a brake cylinder rigidly secured to said brake beam at a point midway between the ends thereof and having a pressure chamber to which fluid under pressure may be supplied, a piston slidably operable in said brake cylinder, a piston rod connected at one end to said piston and having its opposite end anchored to the bolster of the truck to prevent movement of said piston and permit movement of said brake cylinder and brake beam relative to said truck frame upon the supply of fluid under pressure to said pressure chamber, and a hand brake lever fulcrumed intermediate its ends on the bolster and having one end forked and being pivotally connected at said forked end to said brake beam in straddling relation to said piston rod in a manner to effect movement of said beam by manual operation of said hand brake lever in the absence of the supply of fluid under pressure to the pressure chamber of said brake cylinder.

6. In a brake rigging for a railway vehicle truck, the combination of a transversely extending brake shoe carrying brake beam supportable at each end by a truck frame, a brake cylinder rigidly secured to said brake beam substantially midway of the length thereof, a piston slidably mounted in said cylinder, said cylinder having a pressure chamber formed between one end of the cylinder and said piston, a truck bolster supported by said truck frame, a piston rod for said piston extending through an opening in said brake beam into abutting engagement with said truck bolster to prevent movement of said piston, said brake cylinder and brake beam being moved relative to said truck bolster upon the supply of fluid under pressure to the pressure chamber of said cylinder, a pair of lugs secured to said brake beam and disposed one on each side of said piston rod, and a hand brake lever fulcrumed intermediate its ends on said truck bolster and provided at one end with a clevis operatively connected to said pair of lugs to effect movement of said brake beam relative to said truck bolster and frame in response to rocking of said hand brake lever about said fulcrum in the absence of the supply of fluid under pressure to the pressure chamber of said brake cylinder.

7. A truss-type brake beam for a railway car truck, said beam comprising a compression member, a tension member secured to opposite ends of said compression member, and a brake cylinder interposed between and secured to the compression and tension members and constituting and performing the function of the usual strut member of a truss-type brake beam.

References Cited in the file of this patent

UNITED STATES PATENTS

| | | |
|---|---|---|
| 283,368 | Barratt | Aug. 21, 1883 |
| 403,539 | Lawrence | May 21, 1889 |
| 1,472,360 | Frins et al. | Oct. 30, 1923 |
| 2,112,530 | Holloway | Mar. 29, 1938 |
| 2,181,041 | Baselt | Nov. 21, 1939 |
| 2,359,731 | Flesch | Oct. 10, 1944 |
| 2,486,066 | Schaefer | Oct. 25, 1949 |

FOREIGN PATENTS

| | | |
|---|---|---|
| 2,231 of 1853 | Great Britain | Sept. 29, 1853 |
| 9,154 | Great Britain | of 1903 |